…

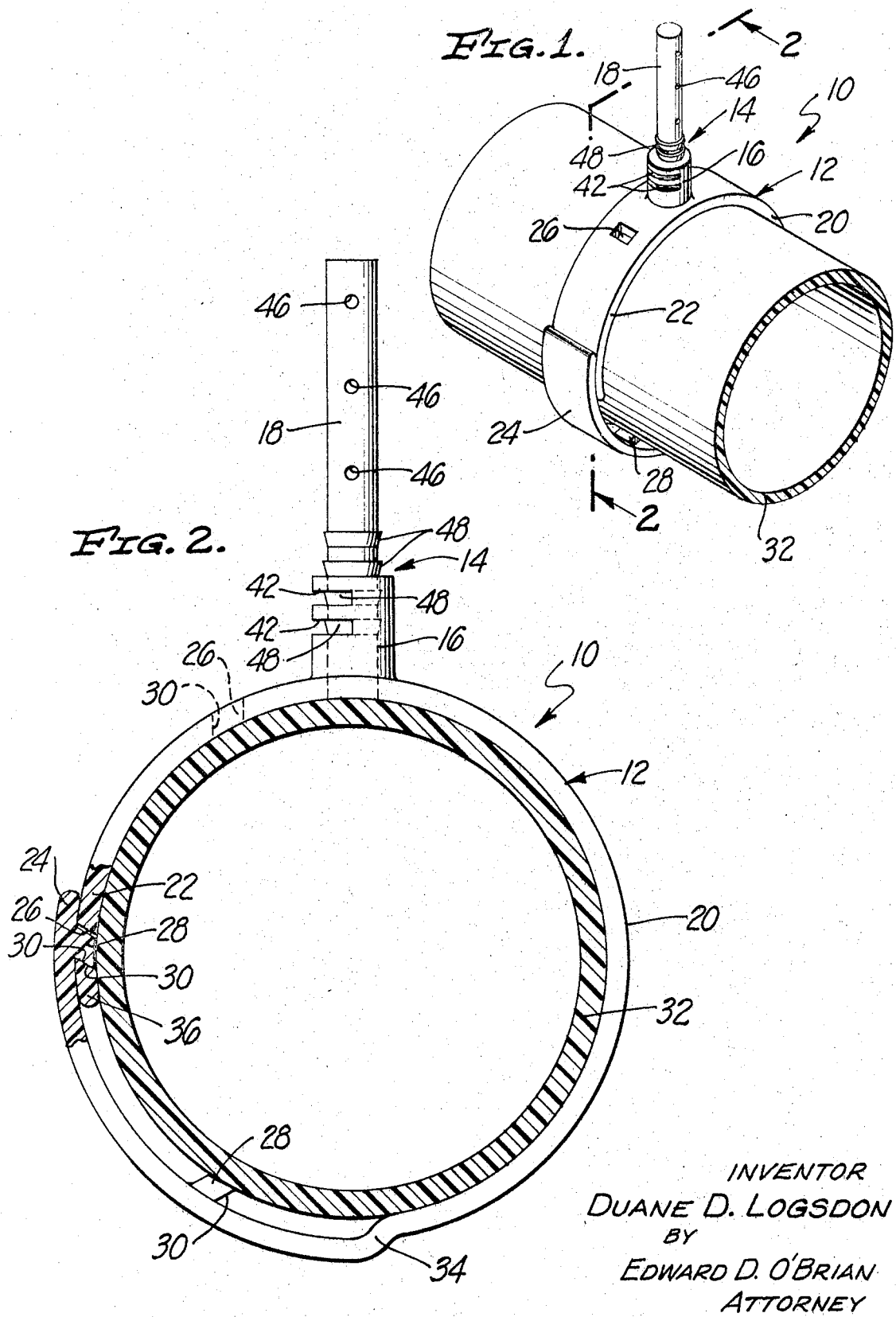

United States Patent Office 3,523,668
Patented Aug. 11, 1970

3,523,668
PIPE HANGER
Duane D. Logsdon, 31416 High View Drive,
Redlands, Calif. 92372
Filed May 27, 1969, Ser. No. 828,231
Int. Cl. F16l 3/12, 3/14
U.S. Cl. 248—59          8 Claims

ABSTRACT OF THE DISCLOSURE

A pipe hanger structure is disclosed which is capable of being used with pipe of several different diameters. This structure includes a means for holding a pipe and an attached means for supporting the holding means. The supporting means comprises an elongated member and a socket. These latter parts are formed so as to include coactive ratchet means. They are manufactured so that the member may be inserted into the socket to a desired length so as to be held in position against movement in the opposite direction by the ratchet means. These ratchet means permit rotation of the member with respect to the socket. The holding means comprises an elongated, resilient strap extending in a generally circular configuration. The ends of this structure carry sets of attaching means capable of being used so as to secure the strap ends together when the strap is secured in place around pipes of different diameter.

BACKGROUND OF THE INVENTION

In plumbing and related work it is frequently necessary to suspend a pipe from a supporting surface, such as a ceiling. So called "pipe hangers" are normally utilized for this purpose. These pipe hangers to be satisfactory should be capable of being easily fitted closely around a pipe. In order to be acceptable for wide utilization, they should also be relatively easy to use and relatively inexpensive.

In the past many different types of pipe hangers have been constructed and utilized. Frequently such hangers have been relatively difficult to assemble in an operative configuration for use. Many of these structures have been inconvenient to use for this reason. Many of these have been constructed in such a manner so that there is difficulty in their adequately performing their intended function. Certain of these prior structures are sufficiently expensive so that it is thought that they are not economically feasible to use.

SUMMARY OF THE INVENTION

An objective of the present invention is to provide new and improved pipe hangers which avoid various disadvantages of prior related structures such as the disadvantages broadly indicated in the preceding discussion. Other objectives of this invention are to provide pipe hangers: which may be easily and conveniently utilized; which satisfactorily perform their intended function; and which are sufficiently inexpensive so that they may be widely utilized.

In accordance with this invention these and other related objectives of the invention are achieved by providing pipe hangers which may be made at a comparatively nominal cost out of known thermoplastic materials such as so-called ABS polymers. Each of the pipe hangers of this invention includes a holding means for holding a pipe and a suspending means attached to the holding means for supporting the holding means. Preferably a part of the suspending means is formed integrally with the holding means; preferably the supporting means includes ratchet means so that the supporting means may be assembled by the parts of it being pushed together to a desired extent. Preferably the holding means is a resilient strap element, the ends of which carry a cooperating attaching means enabling the strap to be secured at about several different sizes of pipe.

BRIEF DESCRIPTION OF THE DRAWING

The invention is best more fully explained by referring to the accompanying drawing in which:

FIG. 1 is an isometric view of a presently-preferred embodiment or form of a pipe hanger of this invention;

FIG. 2 is a partial cross-sectional view taken at line 2—2 of FIG. 1.

The accompanying drawing is primarily intended to be used for explanatory purposes. It will be realized that various modifications and changes such as changes in dimension may be made in the hanger illustrated through the use or exercise of routine engineering skill. For this reason the invention is to be considered as being limited only by the appended claims forming a part of this disclosure.

DETAILED DESCRIPTION OF THE PREFERRED EMBODIMENT

The pipe hanger structure 10 shown in the drawing consists of two primary parts, a holding means 12 for holding a pipe and a support means 14 for supporting the holding means 12 and, of course, any pipe held by it. In the structure 10 the support means 14 comprises a generally tubular or cylindrical socket 16 and an elongated member or shaft 18. With this structure the socket 16 is formed integrally with the holding means 12.

This holding means 12 includes an elongated, resilient strap 20 having ends 22 and 24 which overlap or which are capable of overlapping one another. It will be realized that this strap 20 normally extends in a generally circular or cylindrical path. From the drawing it will be apparent that the socket 16 is formed integrally with the strap 20 adjacent to the first end 22 so as to provide for significant deflection of the remainder of the strap 20.

The end 22 of the strap 20 includes a set of two identical openings 26 located in the strap 20 midway between the sides of this strap. These openings 26 are exposed to the outer surface of the strap 20 and are adapted to be utilized with a second set of two identical teeth 28 formed on the interior of the second end 24 of the strap 20. These openings 26 and teeth 28 may be regarded as cooperating means because of their function as hereinafter explained.

The teeth 28 are constructed so as to fit within the openings 26 and these openings 26 are constructed so as to receive these teeth. Preferably the openings 26 and the teeth 28 have complementary-shaped walls 30 which are capable of engaging one another in a ratchet-like or hook-like manner so as to normally tend to prevent any disengagement of the openings 26 and the teeth 28 except when disengagement as is deliberately caused.

During the use of the holding means 12 the strap 20 may be temporarily deformed so as to fit around a pipe such as the pipe 32 shown in phantom in FIG. 2 of the drawing. Then, this pipe 32 may be secured in place by bringing the endmost tooth 28 from the second end 24 into engagement with the endmost opening 26 in the first end 22, as shown in FIG. 2 of the drawing. In this position the two ends 22 and 24 will be locked in an effective manner against relative movement.

The inherent resiliency of the strap 20 will tend to prevent these engaged ends from becoming disengaged when they are in this position. Because of the fact that the openings 26 are located within the interior area of the strap 20 an endwise blow delivered to any part of this strap will not tend to disengage these ends 22 and 24. The weight of the pipe 32 held in this manner will also normally tend to hold the engaged tooth 28 in place so that there is no danger of accidental disengagement.

A significant advantage of the holding means 12 lies in the fact that it can be utilized with a smaller pipe than the particular pipe 32 as illustrated. During use with the pipe 32 the second end 24 and the unused tooth 28 are spaced a slight distance by a small offset 34 in the strap 20. When the holding means 12 is used with a smaller pipe than the pipe 32 different of the described attaching means are employed.

When the holding means 12 is used with a smaller diameter pipe than the pipe 32, this offset 34 fits against an extremity 36 of the first end 22 and the tooth 28 which is shown as not being used in FIG. 2 fits within the opening 26 closest adjacent to this extremity 36. Also, with such smaller pipe the tooth 28 closest adjacent to the extremity of the end 24 of the strap 20 fits within the opening 26 located adjacent to the socket 16. In this position the ends of the strap 20 will be secured together and in the same manner as before. Because the strap 20 will be compressed to a smaller diameter, it will be held even more securely by virtue of both of the teeth 28 fitting within the openings 26 described.

The socket 16 utilized has the form of a hollow cylinder. It is provided with a plurality of slots 42 extending as far as its centerline. These slots are all of the same dimension and are equally spaced from one another. They extend in planes perpendicular to the axis of the socket 16. These slots 42 are designed to provide recesses between the noncutout portions of the socket 16.

The significance of these slots 42 is apparent from a consideration of the member 18. It is provided with a plurality of spaced cross holes 46 which may be used in nailing the member 18 to a joist or other support. This member 18 is also provided with a plurality of ring-like ratchet teeth 48 which are adapted to fit within the slots 42 so as to engage these slots. These teeth 48 have the general appearance of frustums of right circular cones; they are spaced from one another the same distance as the slots 42 are spaced from one another. When the teeth 48 are engaged within the socket 16 as shown, the holding means 12 is capable of rotation about the axis of the socket 16 and the member 18 so as to place the holding means 12 in different positions. This is considered to be a significant advantage in many applications.

Preferably the holding means 12 and the socket 16 are formed as an integral unit by injection molding techniques out of a somewhat resilient material such as ABS plastic. Preferably the member 18 is also formed out of such material by similar techniques. When so formed the member 18 may be easily inserted within the socket 16 to any desired extent for a particular application by simply forcing this member 18 towards the socket 16. As this occurs some temporary deformation will occur at the teeth 48 and in the socket 16. This includes a ratchet-like action preventing inadvertent or undesired movement of the socket 16 and the member 18 in one direction so that the holding means 12 can be spaced as desired. However, the ratchet like action achieved with this invention permits rotation of the socket 16 and the holding means 12 as described and adjustment in relative spacing between the socket 16 and the member in one direction.

From a careful consideration of the foregoing, it will be realized that the pipe structure 10 described is a simple, effective, relatively inexpensive structure capable of being easily and conveniently used. It will be further realized that this structure 10 possesses advantages not apparent in prior related devices of a similar character.

What is claimed is:

1. A pipe hanger structure having a means for holding a pipe and a means for supporting said holding means wherein the improvement comprises:
    said holding means being an elongated, resilient strap extending in a generally circular configuration and having ends capable of overlapping one another,
    said strap being attached to said supporting means intermediate its ends,
    a set of first attaching means located on one of the ends of said strap so as to be exposed to the exterior of said strap, said first set of attaching means comprising a series of two holes spaced from one another along said strap,
    a set of second attaching means being located on the other of said ends of said strap so as to be exposed to the interior of said strap, said second set of attaching means comprises two teeth,
    the attaching means on said sets closest adjacent to the extremities of said strap being capable of interengagement for the purpose of holding a pipe of one diameter with said holding means,
    a plurality of said attaching means of each of said sets being capable of engaging with one another for the purpose of holding a pipe of a different diameter within said holding means.

2. A pipe hanger structure as claimed in claim 1 wherein:
    said strap includes an offset between said second set of attaching means and remainder of said strap, said offset serving to space the attaching means of said second set other than the one closest adjacent to an extremity of said strap from a pipe when the attaching means on said set closest adjacent to the extremities of said strap are in interengagement so as to hold a pipe.

3. A pipe hanger structure as claimed in claim 2 wherein:
    said offset fits against an extremity of said strap in one position of said attaching means so that a plurality of said attaching means of said sets are in engagement with one another.

4. A pipe hanger structure as claimed in claim 1 wherein:
    said strap includes an offset between said second set of attaching means and remainder of said strap, said offset serving to space the attaching means of said second set other than the one closest adjacent to an extremity of said strap from a pipe when the attaching means on said set closest adjacent to the extremities of said strap are in interengagement so as to hold a pipe,
    said offset fits against an extremity of said strap in one position of said attaching means so that a plurality of said attaching means of said sets are in engagement with one another,
    said first set of attaching means comprises two holes and said second set of attaching means comprises two teeth, said teeth being capable of engaging said holes so as to secure the ends of said strap together.

5. A pipe hanger structure as claimed in claim 4 including:
    said supporting means comprising an elongated member and a socket,
    said member being capable of being inserted into the interior of said socket and of being rotated when inserted into the interior of said socket,
    coacting ratchet means formed on the exterior of said member and on the interior of said socket for limiting movement of said member with respect to said socket to movement in the direction necessary to insert said member into said socket and to rotation of said member with respect to said socket,
    said ratchet means comprising a plurality of ratchet teeth and a plurality of recesses,
    said ratchet teeth and said recesses both extending in planes perpendicular to the axis of said socket when said member is assembled within said socket,
    said member and said socket being capable of temporary deformation during insertion of said member into said socket so as to permit movement of said ratchet teeth and said receesses past one another.

6. A pipe hanger structure having a means for holding pipe and a means for supporting said holding means attached to said holding means wherein the improvement comprises:
said supporting means comprising an elongated member and a socket,
said member being capable of being inserted into the interior of said socket and of being rotated when inserted into the interior of said socket,
coacting ratchet means formed on the exterior of said member and on the interior of said socket for limiting movement of said member with respect to said socket to movement in the direction necessary to insert said member into said socket and to rotation of said member with respect to said socket,
said ratchet means comprising a plurality of ratchet teeth and a plurality of recesses,
said ratchet teeth and said recesses both extending in planes perpendicular to the axis of said socket when said member is assembled within said socket,
said member and said socket being capable of temporary deformation during insertion of said member into said socket so as to permit movement of said ratchet teeth and said recesses past one another,
each of said ratchet teeth comprising a frustum of a right circular cone located on said member,
each of said recesses comprises a slot located in said socket so as to extend from the periphery thereof into the interior thereof,
said ratchet teeth and said recesses being equally spaced on said member and said socket respectively,
said socket being attached to said holding means as an integral part thereof.

7. A pipe hanger structure as claimed in claim 6 wherein:
said holding means being an elongated, resilient strap extending in a generally circular configuration and having ends capable of overlapping one another,
said strap being attached to said extending means intermediate its ends,
a set of first attaching means located on one of the ends of said strap so as to be exposed to the exterior of said strap,
a set of second attaching means being located on the other of said ends of said strap so as to be exposed to the interior of said strap,
the attaching means on said sets closest adjacent to the extremities of said strap being capable of interengagement for the purpose of holding a pipe of one diameter within said holding means,
a plurality of said attaching means of each of said sets being capable of engaging with one another for the purpose of holding a pipe of a different diameter within said holding means.

8. A pipe hanger structure as claimed in claim 7 wherein:
said first set of attaching means comprises two holes and said second set of attaching means comprises two teeth, said teeth being capable of engaging said holes so as to secure the ends of said strap together.

References Cited

UNITED STATES PATENTS

| | | | |
|---|---|---|---|
| 766,890 | 8/1904 | Newberg | 248—59 |
| 1,859,451 | 5/1932 | Martocello | 248—62 X |
| 3,090,826 | 5/1963 | Cochran | 248—74 X |
| 3,302,913 | 2/1967 | Collyer | 248—73 |
| 3,330,517 | 7/1967 | Zimmerman | 248—62 |

FOREIGN PATENTS

| | | |
|---|---|---|
| 1,464,801 | 11/1966 | France. |
| 1,022,820 | 3/1966 | Great Britain. |

CHANCELLOR E. HARRIS, Primary Examiner

U.S. Cl. X.R.

248—74; 285—197